June 15, 1926. Re. 16,362

M. MANNION ET AL

ADJUSTABLE PLUG FOR CLEANING CONDENSER TUBES

Original Filed July 1, 1921

Inventors,
Martin Mannion,
Robert C. Arthur,
By Edson Bros.
Attorneys.

Reissued June 15, 1926. Re. 16,362

UNITED STATES PATENT OFFICE.

MARTIN MANNION, OF PERTH AMBOY, NEW JERSEY, AND ROBERT C. ARTHUR, OF TOTTENVILLE, NEW YORK, ASSIGNORS OF ONE-THIRD TO JOHN MANNION, OF PERTH AMBOY, NEW JERSEY.

ADJUSTABLE PLUG FOR CLEANING CONDENSER TUBES.

Original No. 1,415,600, dated May 9, 1922, Serial No. 481,942, filed July 1, 1921. Application for reissue filed February 14, 1923. Serial No. 619,060.

This invention relates to improvements in means or what may be termed plugs for cleaning interiorly tubes of surface-condensers, or the interior of any type of tubular appliances or devices.

The invention has for its object, among other purposes, to provide for obviating the disadvantages of cleaning especially condenser tubes particularly of the type indicated, or otherwise, heretofore experienced in doing this with the use of long-handled brushes, or other ill-contrived appliances therefor.

A further object of the invention is to provide for carrying out the above indicated purposes in a simple, effective and inexpensive manner and with facility, and to provide for the expeditious functioning of the plug or device.

Other objects of the invention, together with the foregoing, will be apparent from the following description of the construction, operation or application and arrangement thereof, and the annexed illustration of the same.

The invention therefore consists of certain instrumentalities and features of construction substantially as hereinafter more fully disclosed and defined by the appended claims.

The accompanying drawing or illustration discloses the preferred embodiment, or one form, of our invention wherein it will be understood that various changes and modifications as relate to the detailed construction and arrangement of parts may be made without departing from the scope thereof as covered by the claims, and in which drawing—

Figure 1:
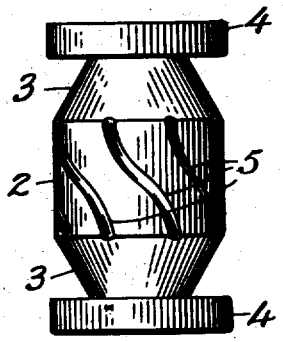
Figure 1 is a plan view of our surface-condenser tube cleaner.
Figure 2:
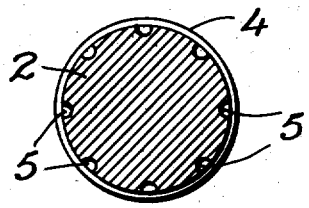
Figure 2 is a transverse vertical section of the same.

As characteristic features of our invention we provide what may be termed preferably a plug which is composed of rubber or other suitable material and which in general outline is preferably that shown, consisting of a preferably central cylindrical portion 2, terminating at its ends into longitudinally tapered or approximately truncated cone-shaped extensions 3, and these in turn terminating at their smaller ends into annular, or disk like portions which may be termed flanges 4. The flanges or disks 4 are of slightly greater diameter than the central cylindric portion 2 as diagrammatically and otherwise indicated in the drawing. These flanges or disks are thus adapted, by being of a greater diameter than the cylindric portion 2 and, of course, than the other portions of the plug, for previous engagement when under air-compression or other pressure with the interior surface of the condenser-tube, said flanges, it will be understood, being adapted to snugly or closely fit within the tube as the plug is initially introduced into the latter. The cylindric portion 2 of the plug is provided with a plurality of grooves or passages 5 extending generally in the direction of the axis of the plug, also in preferably approximately spiral lines along the perimetric surface of said cylindrical portions as shown. It is observed that the plug may be also formed of an inter-mixture of rubber and some suitable abrasive material in its entirety or otherwise if found requisite for the more effective functioning of the plug, as where it may have contact with hard "scale" or substances adhering to the condenser tube.

In using the plug, it is inserted into the condenser-tube or other tubular object for cleaning at one end thereof and subjected to, and driven by compressed-air-pressure, or water or other pressure which may be readily locally obtained and applied to the plug in any suitable way. In case any impediment should be present in the tube, the developed pressure will be delivered to and collapse one of the flanges 4, toward the center of the plug, whence pressure will be conducted into, and be delivered by the grooves or passages 5 toward and cause the collapsing oppositely of the other flange or disk which will accordingly result in clearance of the plug and aid its passage, over the impediment, out through the tube.

From the foregoing it is believed that the purposes and advantages of our invention as set forth above have been made clearly apparent and appreciable.

Having described our invention, what we claim and desire to secure by Letters Patent is:

A projectile plug for flue-cleaners, consisting of a body-portion having longitudinally extending spiral peripheral grooves and tapering ends and laterally extending flanges on said ends, said body and flanges being of collapsible material and said flanges extending beyond said body portion.

In testimony whereof we affix our signatures.

MARTIN MANNION.
ROBERT C. ARTHUR.